May 2, 1950 F. H. HACKER ET AL 2,506,421
CAR TOP CARRIER
Filed Dec. 13, 1946 2 Sheets-Sheet 1
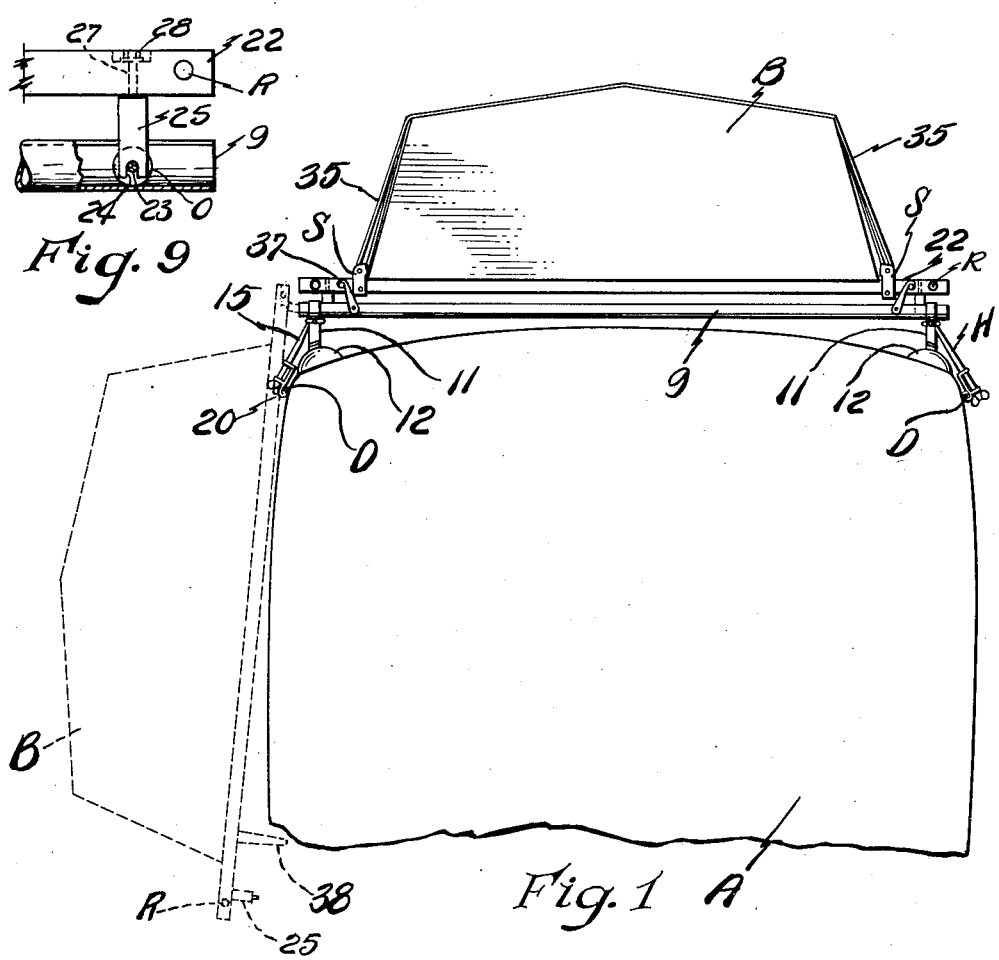
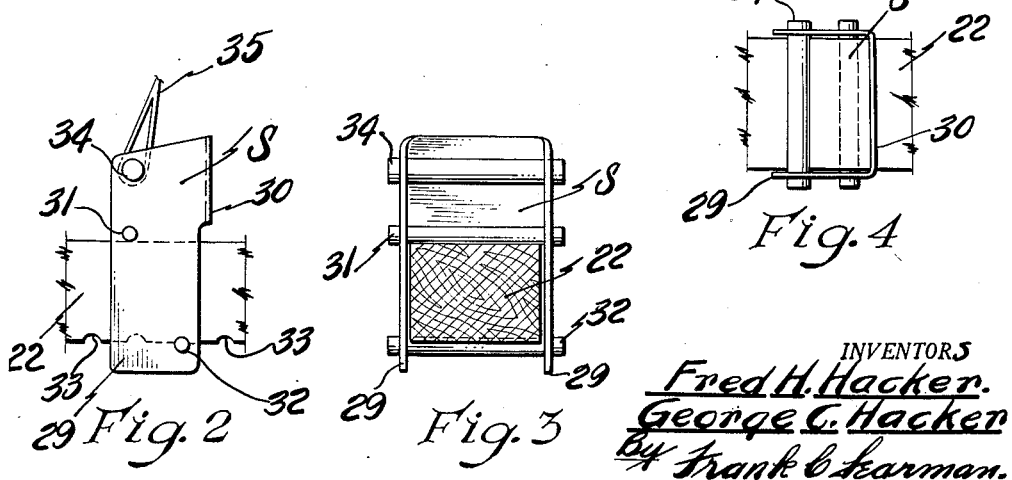
INVENTORS
Fred H. Hacker.
George C. Hacker
by Frank C. Fearman
ATTORNEY May 2, 1950   F. H. HACKER ET AL   2,506,421
CAR TOP CARRIER
Filed Dec. 13, 1946   2 Sheets-Sheet 2
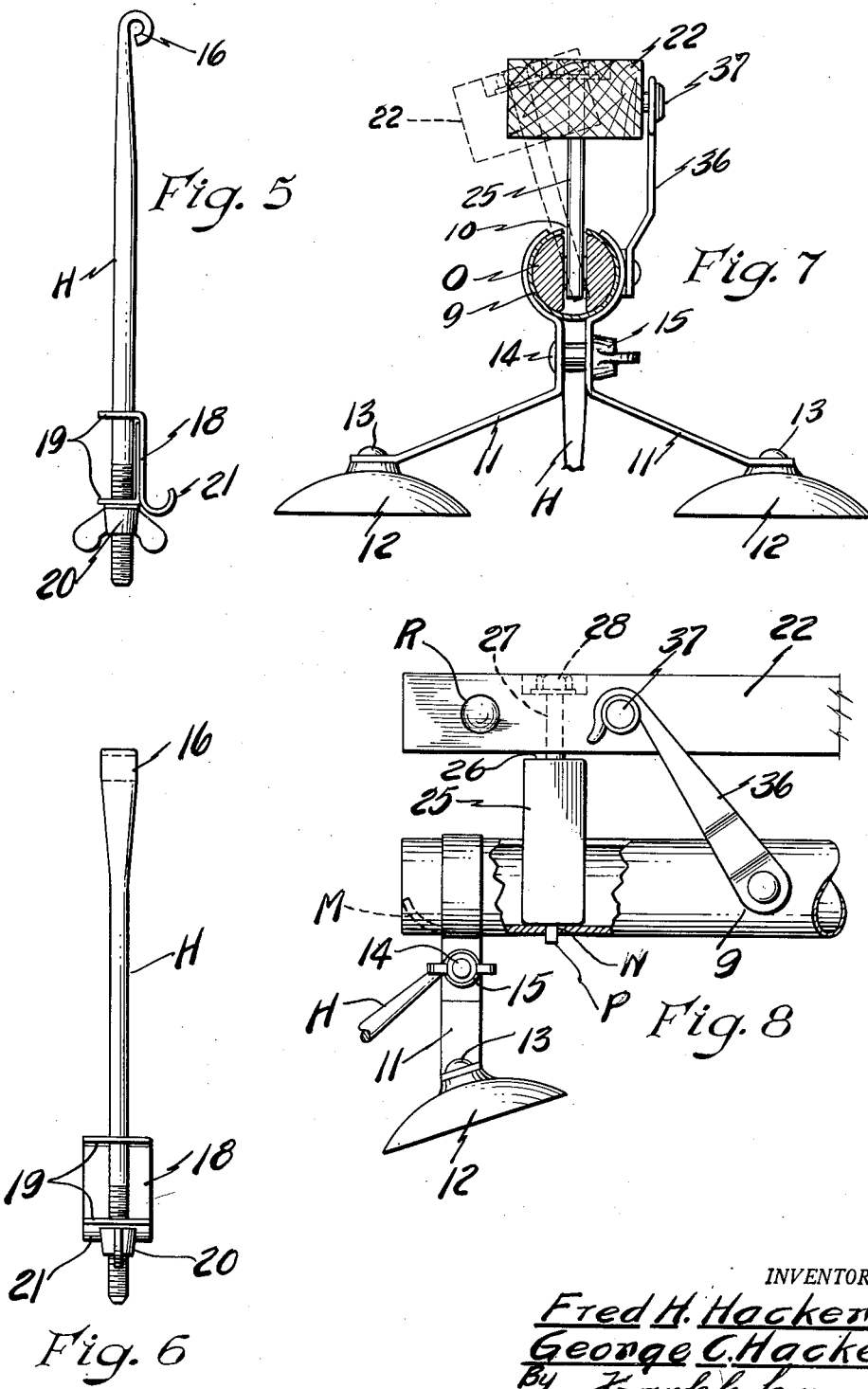
INVENTORS
Fred H. Hacker
George C. Hacker
By Frank C. Feorman
ATTORNEY Patented May 2, 1950

2,506,421

UNITED STATES PATENT OFFICE 2,506,421

CAR TOP CARRIER

Fred H. Hacker and George C. Hacker,
Bay City, Mich.

Application December 13, 1946, Serial No. 716,148

5 Claims. (Cl. 224—42.1)

This invention relates to an automobile top carrier for transporting of boats, luggage, canoes, and similar articles on the top of an automobile.

One of the prime objects of the invention is to design a carrier apparatus of simple, sturdy design and onto which a boat, camping equipment, or luggage of any nature may be easily loaded with a minimum of effort, and without the necessity of standing on the vehicle hood, bumpers, a platform, or other support.

Another object is to design a carrier structure which can be easily and quickly mounted in position, and which includes tracks and carrier supports attachable to the boat or article to be carried, so that the boat or article, with the carrier supports in position, may be moved sidewise in the tracks across the top of the vehicle until the boat or article is properly balanced thereon, after which it can be readily secured in position.

A further object is to design a carrier on which the track members are rotatably adjustable in the supporting brackets, so that the carrier bar may be adjusted to compensate for the curvature of the vehicle top.

A further object is to design a very simple, practical, and substantial carrier structure composed of few parts, all of light yet sturdy design, and that can be readily manufactured and assembled.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a fragmentary, end-elevational view of an automobile body showing our carrier structure in position thereon with a boat on the carrier, the broken lines showing the boat in position for loading.

Fig. 2 is an enlarged, fragmentary, side-elevational view showing the load snub clip assembly.

Fig. 3 is a sectional, end-elevational view thereof.

Fig. 4 is a top plan view.

Fig. 5 is a side-elevational view of the track hold-down hook.

Fig. 6 is an edge view thereof.

Fig. 7 is an enlarged, transverse, part-sectional view showing the vacuum cups and support assembly, the broken lines illustrating the adjustment of the carrier bar to suit the curvature of the vehicle top.

Fig. 8 is a fragmentary, part-sectional, side-elevational view showing one end of the carrier bar, and Fig. 9 is a fragmentary, part-sectional view of the opposite end of the tracks and carrier bars, illustrating the support on one end of the bars.

Referring now more specifically to the drawings in which we have shown the preferred embodiment of our invention. The numeral 9 indicates one of the transversely disposed tracks that forms a part of the carrier structure. This is preferably tubular in cross-section and is of predetermined length to span the top of the automobile body A.

The track 9 is preferably formed of metal, and is slit as at 10 and for a purpose to be presently described. Spaced-apart pairs of support brackets or clamps 11 are secured to the track 9 adjacent the ends thereof, and vacuum cups 12 are secured to the lower ends of the clamp brackets by means of screws 13 or the like, the upper end of each bracket being shaped to embrace the track 9 which is rotatable therein, and a bolt and wing nut assembly 14 and 15 respectively provides means for rigidly clamping the track in adjusted position.

Hold-down hooks H serve to secure the track against sidewise movement on the vehicle body, the upper end of the hook being flatted and rolled to form an open eye 16 for engagement with the bolt 14 that spans the clamping brackets 11.

A metal clip 18 is mounted on the hook H and is formed with spaced legs 19 through which the hold-down hook extends, the lower end of each hook being threaded as shown, and a wing nut 20 is threaded thereon for easy adjustment.

A hook 21 is formed integral with the clip 18, said hook engaging the metal drip strip D which forms a part of the vehicle body.

Carrier bars 22 are mounted on the tubular tracks 9, and include supports 25 on the opposite ends thereof, the supports on the one end being formed with a preferably split ball member O (see Fig. 9), which is mounted for sliding or rolling movement in the track 9, and a pin 23 spans said ball.

The bifurcated end 24 of the support 25 straddles the pin 23, the upper end of the support being shouldered as at 26 and terminates in a bolt section 27 that projects through a suitable opening in the carrier bar 22, the upper end of the section 27 being threaded to receive a nut 28 for rigidly securing it to the bar.

The supports on the opposite ends of the bars are formed as clearly shown in Fig. 8 of the drawings, and are slightly longer, the balls O being omitted, and a pin P is provided in the lower end of the support, said pin registering with an opening N provided in the track 9, and when it is desired to move the bars to position shown in broken lines in Fig. 1 of the drawings, the ends of the bars 22 are raised to disengage the pins P, and the supports can then be pulled endwise and can be swung down to position shown in Fig. 1, the one end of each track being turned as at M (see Fig. 8) to form a stop for said rollers.

These ball assemblies O readily slide and/or roll in the tracks 9 and provide for smooth and easy loading and unloading of the boat or equipment carrier, and the tracks are, of course, provided with openings (not shown), so that water readily drains therefrom.

Preferably stamped snub clips S are adjustably mounted on the carrier bars 22 (see Figs. 2, 3, and 4), and include spaced-apart depending legs 29, connected as at 30, and pins 31 and 32 respectively span said legs, the lower edge of the carrier bar being formed with a plurality of grooves 33 that form seats for the lower pin 32 to secure the snub clip in position. These clips are adjustable longitudinally on the bar, it being merely necessary to swing or tilt the upper end of the clip about the pin 32. It can then be readily shifted to suit the article being carried.

An anchor pin 34 spans the upper section of the clip S, and a flexible strap 35 is secured thereto, these straps serving to secure the boat on the carrier bars.

It will be noted that the pins 31 and 32 are angularly disposed with relation to each other, the pin 31 being located directly adjacent one edge of the clip, while the pin 32 is located directly adjacent the opposite edge; these clips are readily adjustable longitudinally of the bar, it is merely necessary to swing the upper end of the clip about the pin 32 so that it can be lowered clear of the groove 33, and the clip is then readily slidable longitudinally on the bar.

A hook 36 is pivotally mounted on the side wall of the track 9, and a pin 37 is provided on the side of the carrier bar as shown, this hook serving to secure the tracks and carrier bar in fixed relation.

Foldable legs 38 are pivotally secured to the side of the carrier bars 22, these legs being swung out to position indicated in broken lines in Fig. 1 of the drawings when the boat is being loaded, the outer end of the leg being covered with felt or soft material (not shown) to prevent marring, and the leg is readily foldable into a notch 39 in the carrier bar when the boat is loaded.

It will, of course, be understood that there are two mounting units, both exactly the same, and it is therefore necessary to describe but the one unit.

In practice, the tubular tracks 9 are mounted on the top of the vehicle body A with the vacuum cups 12 firmly pressed in position, and the hold-down hooks H attached to the metal drip strip D on the side of the body, thus forming a firm mounting.

When loading, both of the carrier bars 22 are swung down and are attached to the open top of the boat B by means of the flexible straps 35, and longitudinally disposed rods R are provided for spacing said bars. Then, by raising the free edge of the boat upwardly, the rollers O slide or roll in the tracks 9 across the vehicle top, until the pins P enter the openings N and as clearly shown in solid lines in Fig. 1 of the drawings, after which the hooks 36 are engaged with the pins 37 and the boat will be securely locked in position.

To unload, it is merely necessary to reverse the operation above-described.

This arrangement eliminates the heavy overhead lifting where the boat must be raised bodily to the top of the vehicle body, and likewise, it is not necessary to stand on the vehicle hood and the rear bumper; the car finish is not damaged, and the loading can be easily and quickly accomplished.

What we claim is:

1. A vehicle top carrier of the class described including tracks spanning the vehicle top and provided with vacuum cups thereon for engagement with said top, carrier bars removably associated with said tracks and provided with ball assemblies on one end thereof for travel in said tracks, means for locking the carrier bars and the tracks in superimposed relation, and flexible straps for securing the article to be carried to the carrier bars.

2. The combination as defined in claim 1 in which stops are provided on one end of each track member to prevent disengagement of the ball assemblies.

3. The combination as set forth in claim 1 in which hold-down members are secured to the tracks and the vehicle top respectively for securing the tracks against endwise shifting on said top.

4. The combination defined in claim 1 in which the tracks are tubular in cross-section, and longitudinally slit to accommodate the carrier bar supports.

5. A car top carrier of the class described, comprising a transversely disposed track member provided with vacuum cups adapted to engage the car top, a carrier bar shiftable longitudinally on said track and removably mounted therein, spaced-apart grooves provided in the carrier bar, snubbing clips detachably engageable in said grooves, means engageable with the car body and the track for preventing endwise shifting of said track, and means for releasably locking the track and carrier bar against endwise movement with relation to each other.

FRED H. HACKER.
GEORGE C. HACKER.

REFERENCES CITED

The following references are of record in the file of this patent:

UNITED STATES PATENTS

| Number | Name | Date |
| --- | --- | --- |
| 1,180,253 | Carlson | Apr. 18, 1916 |
| 1,772,439 | Garbs | Aug. 5, 1930 |
| 1,813,094 | Appel | July 7, 1931 |
| 2,144,876 | Garnett | Jan. 24, 1939 |
| 2,171,053 | White et al. | Aug. 29, 1939 |
| 2,318,971 | Roumage et al. | May 11, 1943 |
| 2,446,092 | Lait | July 27, 1948 |

FOREIGN PATENTS

| Number | Country | Date |
| --- | --- | --- |
| 44,648 | France | Dec. 15, 1934 |
| 49,274 | France | Nov. 12, 1938 |
| 470,264 | Great Britain | Aug. 11, 1937 |
| 502,494 | Great Britain | Mar. 20, 1939 |